(12) United States Patent
Rhodes et al.

(10) Patent No.: US 7,498,090 B2
(45) Date of Patent: *Mar. 3, 2009

(54) COMBINATION INCLUDING CORROSION RESISTANT COMPOSITION

(75) Inventors: Philip S. Rhodes, Teaneck, NJ (US);
David Rosenberg, Jersey City, NJ (US);
John Wajakowski, Topeka, KS (US)

(73) Assignee: Hycrete, Inc., Carlstadt, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/842,741

(22) Filed: Aug. 21, 2007

(65) Prior Publication Data

US 2008/0038473 A1    Feb. 14, 2008

Related U.S. Application Data

(60) Division of application No. 11/262,201, filed on Oct. 28, 2005, now Pat. No. 7,261,923, which is a continuation-in-part of application No. 10/447,975, filed on May 29, 2003, now abandoned, and a continuation-in-part of application No. 10/708,012, filed on Nov. 6, 2003, now Pat. No. 7,381,252.

(51) Int. Cl.
| | |
|---|---|
| B32B 13/00 | (2006.01) |
| B32B 15/18 | (2006.01) |
| C04B 24/04 | (2006.01) |
| C04B 103/61 | (2006.01) |
| C23F 11/00 | (2006.01) |
| C09D 5/08 | (2006.01) |
| B05D 1/02 | (2006.01) |
| B05D 1/28 | (2006.01) |
| B05D 5/00 | (2006.01) |

(52) U.S. Cl. ............ 428/703; 106/14.13; 106/14.41; 106/14.44; 106/728; 106/810; 252/389.1; 252/389.2; 252/389.24; 252/389.31; 252/396; 427/299; 427/368; 427/384; 427/419.8; 427/421.1; 427/429; 428/411.1; 428/457; 428/470

(58) Field of Classification Search ............ 106/14.13, 106/14.41, 14.44, 728, 810; 428/703, 411.1, 428/457, 470; 252/389.1, 389.2, 389.24, 252/389.31, 396; 427/299, 368, 384, 419.8, 427/421.1, 429

See application file for complete search history.

(56) References Cited

U.S. PATENT DOCUMENTS

| 3,682,718 | A | 8/1972 | Palm et al. |
|---|---|---|---|
| 3,763,083 | A | 10/1973 | Grotheer |
| 4,869,752 | A | 9/1989 | Jaklin |
| 6,071,436 | A | 6/2000 | Incorvia |
| 6,277,450 | B1 | 8/2001 | Katoot et al. |
| 6,605,577 | B1 | 8/2003 | Harrison et al. |
| 7,261,923 | B2 | 8/2007 | Rhodes et al. |
| 2004/0237834 | A1 | 12/2004 | Humphrey et al. |
| 2004/0237835 | A1 | 12/2004 | Rhodes et al. |
| 2006/0096497 | A1 | 5/2006 | Rhodes et al. |

FOREIGN PATENT DOCUMENTS

| JP | 4-255709 | 9/1992 |
|---|---|---|
| JP | 6-115992 | 4/1994 |
| WO | 85/05066 | 11/1985 |
| WO | 97/20900 | 6/1997 |
| WO | 98/01509 | 1/1998 |
| WO | 02/43881 | 6/2002 |

OTHER PUBLICATIONS

Allyn Jr. et al, "Strength And Durability Of Concrete Containing Salts Of Alkenyl-Succinic Acid", ACI Materials Journal, 98(1), pp. 52-58 (Jan.-Feb. 2001).

Allyn Jr. et al, "Corrosion Tests With Concrete Containing Salts Of Alkenyl-Substituted Succinic Acid", ACI Materials Journal, 98(3), pp. 224-232 (May-Jun. 2001).

Goodwin, et al., Protection of Reinforcement With Corrosion Inhibitors, Phase II, Dec. 2002, 125 pages.

Civjan, et al., Performance Evaluation and Economic Analysis of Combinations of Durability Enhancing Admixtures (Mineral and Chemical) in Structural Concrete for The Northeast U.S.A., Feb. 2003, 165 pages.

*Primary Examiner*—Anthony J Green
(74) *Attorney, Agent, or Firm*—McCarter & English, LLP

(57) ABSTRACT

A combination includes a composition providing corrosion resistance for application to a post-construction material, and a post-construction material, wherein the composition is applied to at least one surface of the post-construction material after the post-construction material has hardened. The composition may include an effective amount of a thinning agent, e.g., isopropyl alcohol, ethanol, xylene or similar composition. The composition may be an aqueous solution of a metal salt of a dioic acid. The post-construction material may be reinforced or unreinforced concrete. The post-construction material may be a concrete-containing structure, and the composition may be applied to an exterior surface thereof.

12 Claims, 3 Drawing Sheets

Effect of Hycrete on a Corroding Reinforcing Bar

COMBINATION INCLUDING CORROSION RESISTANT COMPOSITION

CROSS REFERENCE TO RELATED APPLICATIONS

The present application is a divisional application and claims the benefit of a commonly assigned, non-provisional U.S. patent application entitled "Corrosion Resistant Composition For Treatment of Hardened Concrete Structures," filed Oct. 28, 2005 and assigned Ser. No. 11/262,201, now U.S. Pat. No. 7,261,923, which is a continuation-in-part application and claims the benefit of a non-provisional U.S. patent application entitled "Anti-Corrosion Additive For Compositions in Contact with Iron-Based Substrates," filed May 29, 2003 and assigned Ser. No. 10/447,975, now abandoned, and a non-provisional U.S. patent application entitled "Anti-Corrosion Additive Composition for Concrete Compositions for Use in Reinforced Concrete Structure," filed Nov. 6, 2003 and assigned Ser. No. 10/702,012, now U.S. Pat. No. 7,381,252. The contents of the foregoing non-provisional applications are incorporated herein by reference.

BACKGROUND OF THE INVENTION

1. Technical Field

The present disclosure generally relates to a composition or system for use with post-construction materials, and more particularly relates to a composition or system providing corrosion and/or moisture resistance for post-construction reinforced and unreinforced concrete structures.

2. Description of Background Art

The cost of corrosion in materials is devastating with respect to human fatalities. From a financial perspective, the cost of corrosion is estimated to be over $300 billion each year in the United States. The problem of preventing corrosion remains a challenge confronting the construction and maintenance industries.

Commonly, structures are made of concrete materials. Because conventional concrete has very low tensile strength, common practice is to reinforce concrete with steel bars in applications where the concrete is subjected to substantial loads. In such an instance, the concrete has at least two functions. One such function is to protect the reinforcing steel bars against corrosion. Another prominent function is to improve resistance from shear and compressive stresses. As a general matter, the protective effect of hardened concrete against climatic and environmental conditions on reinforcing steels depends, for example, on the amount and type of cement, water/cement factor and concrete integrity. However, since concrete is also a permeable absorptive material, it often leads to undesirable intrusion of moisture and other substances, such as chloride, sulfate, and even carbon dioxide, all of which can lead to corrosion of the reinforcing steel. As the reinforcing steel corrodes, it expands, thus cracking the concrete, which in turn allows for more impurity invasion, e.g., water and chloride ingress, which in turn advances corrosion as the cycle builds. Moreover, as a result of various distresses, such as environmental conditions, including at least shear and compressive stresses, accumulated after some length of service, the concrete can eventually crack and fail. These processes often lead to premature deterioration and subsequent failure of concrete structures.

Efforts have been made to solve the premature deterioration of such structures. For example, U.S. Pat. No. 4,869,752 to Jaklin describes the use of modified inorganic silicates, e.g. modified alkali silicates, as a concrete additive to prevent corrosion of steel structures or reinforcing steel. U.S. Pat. No. 6,277,450 to Katoot describes the use of a coating process to coat metal surfaces which are modified to an active moiety of metal hydroxide receptive to a fully cross-linked polymer of various thickness. Other processes that have been used have included precoating surfaces of metals used in the building and construction industry. However, such methods are generally costly, ineffective and inefficient/impractical.

Despite efforts to date, a need remains for corrosion-resistant treatments, materials and processes that are effective, efficient and reliable. For example, there is a need for a composition/system that may be used with post-construction materials to provide corrosion resistance and/or moisture resistance to reinforced and unreinforced hardened concrete that is effective, efficient and offers desirable cost/benefit properties.

SUMMARY OF THE PRESENT DISCLOSURE

According to the present disclosure, compositions and systems for use in treating post-construction materials are provided. The disclosed compositions and systems are particularly useful in treatment modalities wherein hardened concrete structures are subjected to one or more applications of an advantageous corrosion-resistant and/or moisture-resistant material/system. The disclosed treatment modalities are advantageously effective in reducing the rate and/or impact of corrosion in or for a concrete-containing structure. Thus, for example, the disclosed corrosion inhibiting composition/system may be applied to a hardened concrete-containing structure through various treatment techniques, e.g., by spraying, brushing or misting an effective amount of the disclosed corrosion inhibiting composition/system onto one or more surfaces of the concrete-containing structure. The treated structure(s) advantageously demonstrate improved corrosion properties, e.g., a substantially reduced corrosion rate.

In an exemplary embodiment of the present disclosure, an aqueous solution of an alkali metal salt of a dioic acid is employed to effect the desired corrosion-resistant and/or moisture-resistant properties, e.g., an alkali sodium salt thereof. The disclosed aqueous solution/composition provides corrosion resistance and moisture resistance to structures and/or surfaces that include hardened concrete, e.g., post-construction materials and structures. The disclosed aqueous solution/composition generally includes an alkali salt of a dioic acid of the following formula:

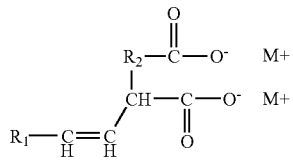

wherein M+ is selected from the group comprising Na+ and K+; $R_1$ is a $C_1$ to $C_{24}$ branch or linear aliphatic compound; and $R_2$ is a $C_1$ to $C_{10}$ branch or linear aliphatic compound.

Exemplary corrosion-inhibiting and moisture-inhibiting solutions and systems of the present disclosure may further include a thinning agent and/or a carrier that is effective to reduce the viscosity of the disclosed solution/system. For example, a thinning agent may be incorporated into the disclosed solution/system in an amount of about 5% to about 70% by weight. The thinning agent advantageously facilitates penetration of the disclosed corrosion-inhibiting solution/ system into the concrete-containing structure, e.g., through pores, cracks and/or fissures formed or defined in the concrete-containing structure. Exemplary thinning agents include isopropyl alcohol or a similar solvent (or combinations thereof). Of note, the disclosed thinning agents may additionally function to reduce the potential for impurity(ies) to react with the disclosed corrosion-inhibiting solution/system, e.g., potential reactions with Ca+ ions in the concrete-containing structures, thereby enhancing the stability and/or overall effectiveness of the disclosed corrosion-inhibiting solution/system.

Post-construction materials and structures that may be treated with the disclosed solutions/systems vary widely, and include structures such as reinforced or unreinforced concrete assemblies or elements, mortar, stucco and the like. In exemplary embodiments of the present disclosure, the disclosed solution/system may be applied directly to the exterior surface of a reinforced and/or unreinforced concrete structure and be permitted to penetrate to interior regions thereof, e.g., by capillary action.

In a further exemplary embodiment of the present disclosure, advantageous methods and/or techniques for treating post-construction structures and assemblies are provided, particularly post-construction structures and assemblies that include a hardened concrete component. According to exemplary embodiments of the disclosed method, a composition is applied or otherwise added to the post-construction structure or assembly, the composition having a formula:

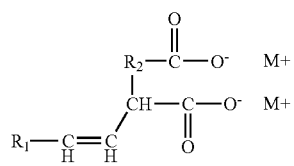

wherein M+ is selected from the group comprising Na+ and K+; $R_1$ is a $C_1$ to $C_{24}$ branch or linear aliphatic compound, and $R_2$ is a $C_1$ to $C_{10}$ branch or linear aliphatic compound. The composition is generally applied directly to a post-construction surface in an amount effective to achieve a corrosion-inhibiting and/or moisture-inhibiting effect, thereby reducing the deleterious effects of corrosion post-treatment.

According to exemplary embodiments, the disclosed method further includes the step of adding a thinning agent to the composition, such thinning agent generally being added in an amount of about 5% to about 70% by weight. The thinning agent may be isopropyl alcohol or a similar solvent (or combinations thereof). In still further embodiments of the disclosed method, a washing step may be undertaken to remove or reduce the level of impurities on the surface of the post-construction surface prior to applying the disclosed composition. Indeed, the disclosed composition may also be mixed with a coating material prior to application.

Additional features, functionalities and beneficial results associated with the disclosed corrosion-inhibiting solution/system and treatment modalities associated therewith will be apparent from the detailed description which follows, particularly when read in conjunction with the appended figures.

BRIEF DESCRIPTION OF THE FIGURES

To assist those of ordinary skill in the art in making and using the disclosed corrosion-inhibiting solutions/systems, reference is made to the accompanying figures, wherein.

DETAILED DESCRIPTION OF EXEMPLARY EMBODIMENT(S)

Figure 1:
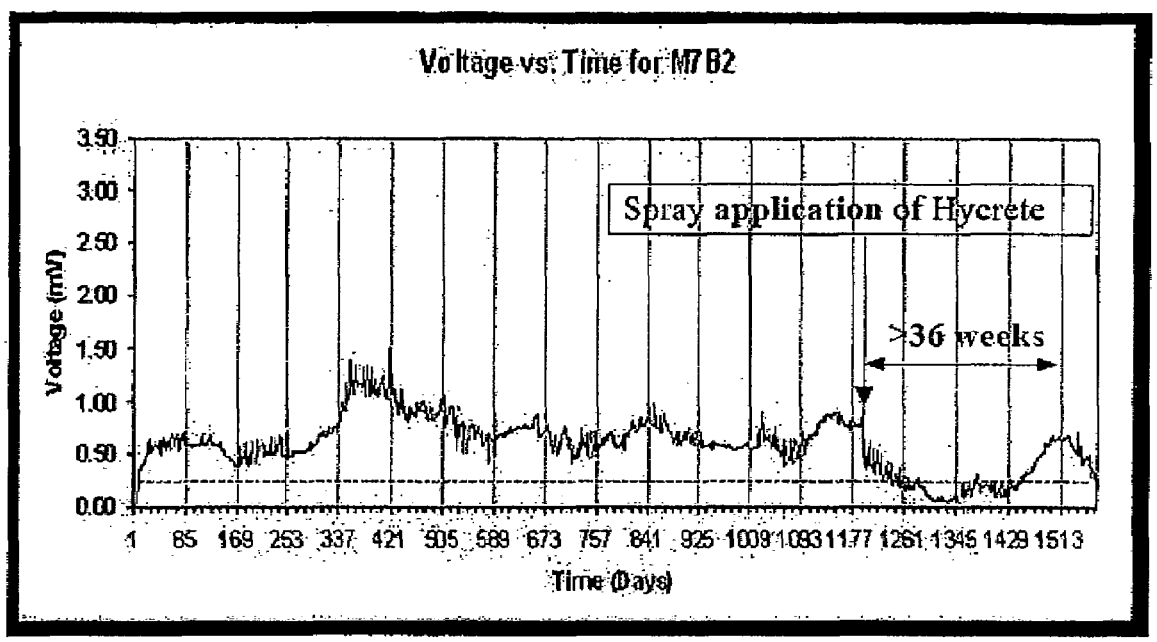
FIG. 1 is a macro cell current test graph of voltage vs. time for a post-construction cement article treated according to an exemplary embodiment of the present disclosure.

The present disclosure generally relates to an additive composition or system that provides corrosion resistance and moisture resistance protection to post-construction materials, such as concrete, mortar, stucco, steel, and the like. In particular, the additive composition acts to stabilize material susceptible to corrosion, for example, in concrete, and also acts to block or inhibit moisture flow through cracks, pores and fissures. While the disclosure herein primarily discusses the additive composition for use with post-construction concrete material, it is to be understood that the use of concrete material is merely for illustrative purposes and is not intended to limit the use of the additive composition to just concrete material.

The additive composition of the present disclosure includes a solution of an alkali metal salt of a dioic acid, typically an aqueous solution thereof. Thus, the additive composition may be a water-based solution that includes a mixture of organic alkenyl dicarboxylic acid metal salts (e.g., sodium salt) and additives. The disclosed additive composition has the following formula:

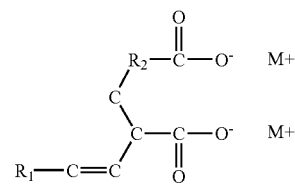

wherein M+ may be selected from a group including, for example, Na+ and K+; $R_1$ may be a $C_1$ to $C_{24}$ branch linear aliphatic hydrocarbon and $R_2$ may be a $C_1$ to $C_{10}$ branch or linear aliphatic hydrocarbon, and may be prepared in accordance with the following reactions:

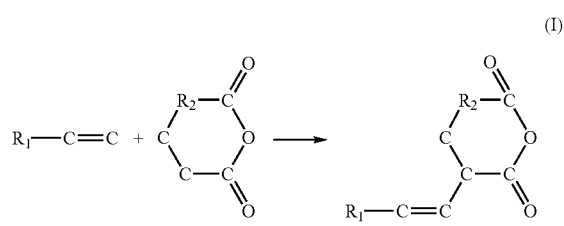

wherein the resulting addition compound is reacted with alkaline hydroxide as follows:

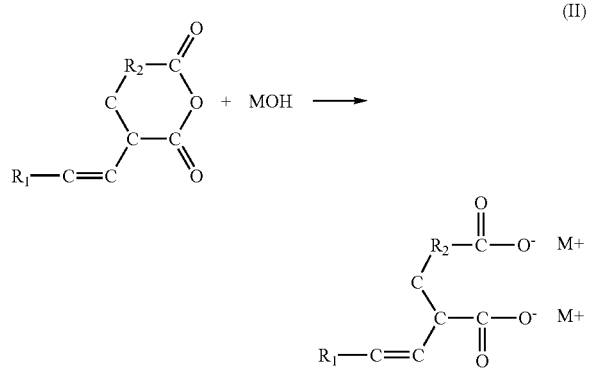

to form a dimetal-based salt solution of dioic acid (e.g., disodium-based salt). In other embodiments, the additive composition may be admixed in an effective amount with a composition to be placed in contact with exposed iron or steel for subsequent application to the exposed iron or steel.

Reaction (I) is typically effected at elevated temperatures and pressures for a time sufficient to form the disclosed alkene dioic acid anhydride composition. For example, the temperature may be about 450° F., the pressure may be about 40 psi for a time period of about eight (8) hours. The resulting material (after removal of unreacted materials) may be introduced into an appropriate unit, e.g., a batch still or film evaporator, to collect a distillate of alkene dioic acid anhydride composition. The alkene dioic acid anhydride composition may then be introduced into a stainless steel reactor that typically includes a reflux condenser. An aqueous solution of sodium or potassium hydroxide may be slowly introduced for a portion of time and at a temperature sufficient to effect conversion thereof to a disodium or dipotassium salt solution.

According to the present disclosure, the disclosed corrosion-inhibiting, additive composition may further include a thinning or dilutive agent. The thinning agent is generally selected from materials that are non-reactive with the disclosed corrosion-inhibiting composition/solution. An exemplary thinning agent for use according to the present disclosure is isopropyl alcohol, although other thinning agents (and thinning agent blends/mixtures) may be employed, e.g., ethanol and/or xylene, without departing from the spirit or scope of the present disclosure. The thinning agent generally functions to reduce the viscosity of the composition and to reduce the likelihood of reaction with impurities (e.g., calcium ions) by reducing the initial concentration of the active composition. In exemplary embodiments of the present disclosure, a thinning agent is added at a level sufficient to decrease the viscosity of the solution/system which in turn increases penetration depth of the thinned solution/system when applied to a reinforced or unreinforced concrete structure in situ. Preferably, the thinning agent is added at a level of about 5% to about 70% by weight and, more preferably, about 5% to about 30% by weight relative to the additive composition.

According to exemplary embodiments of the present disclosure, the additive composition provides at least two levels of protection to the treated structure/assembly. For example, the first level of protection includes or involves corrosion resistance protection. Thus, the diluted solution/system is capable of migrating to a potential corrosive site and forming a monomolecular film thereon. Of note, the additive composition exhibits polarity at one molecular end thereof, thereby facilitating adherence and/or attachment with respect to oppositely charged polar/ionic substrates, for example, iron and/or other metallic molecules and the like.

The second level of protection that the disclosed additive composition provides to post-construction structures/assemblies is moisture resistance. This moisture resistance arises, at least in part, from a blockage effect that is achieved by the disclosed composition/system when applied in situ. Because the additive composition is reactive, it will tend to react with, for example, metallic or other ions in the aqueous systems that it encounters, metallic or other ions that it encounters in the concrete, and/or metallic or other ions that it encounters in the reinforcement materials/substrates associated with the post-construction structures/assemblies. From one or more of the noted reactions (or other reactions that may occur due to the constituents present in or on the post-construction structure/assembly), molecules/compounds having limited water solubility, e.g., precipitates, are formed that include long hydrocarbon chains. These long chain hydrocarbon chains are generally hydrophobic. Analogous to oil repelling water, the noted molecules/compounds, e.g., precipitated materials, fill the capillaries, cracks and/or fissures of the post-construction structure/assembly, e.g., the hardened concrete substrate to which the disclosed solution/system was applied, thereby advantageously repelling water and preventing or reducing capillary absorption.

Of note, the active ingredients of the additive composition may be highly soluble in water, but also exhibit a tendency or proclivity to react with metals, such as iron and calcium, to form water insoluble or slightly soluble metallic salts. Thus, the disclosed additive composition may function to form a wax-like substance when applied to a post-construction structure/assembly and such wax-like substance may be characterized by a first end that is substantially hydrophilic and a second, opposing end that is substantially hydrophobic.

As is known by those skilled in the art, corrosion generally occurs in what may be described as an oxy-redux reaction, whereby electrons flow through the metal from the anode to the cathode. If the anode is protected, electrons from hydroxyls (OH—) are prevented from entering. Conversely, if the cathode is protected, electrons are prevented from flowing thereto.

For purposes of an electron-flow discussion, additive compositions according to the present disclosure generally protect the anode. As electrons flow, the anode develops a positive charge. The positively charged surface then attracts the strongly electronegative or hydrophilic end of the additive composition. Upon the additive composition reaching the surface, it generally bonds or attaches itself to the iron of the reinforcing steel to form a slightly soluble hydrophobic layer which protects the anode potential of the iron/reinforcing steel. With respect to exemplary embodiments of the disclosed treatment regimen wherein the post-construction material is concrete, the cured/hardened concrete generally contains water molecules in pores, cracks and/or fissures defined in the hardened concrete, such water molecules enabling the additive composition to migrate to the anodic surface of the reinforcing steel within the concrete structure. Additionally, excess additive composition generally reacts with calcium (or other impurities) to form substantially water insoluble molecules/compounds, e.g., precipitate molecules, that reduce the water permeability of the hardened concrete structure/assembly. This reduced permeability further mitigates the corrosion process and/or the potential for further corrosion of any underlying reinforcing steel.

Various testing methodologies may be employed to assess the effects on corrosion of the disclosed additive compositions, e.g., in post-construction applications thereof. For example, corrosion-related testing may include polarization resistance measurements, IR drop, and visual examination. Additionally, testing according to ASTM G109, macro cell and half cell corrosion current activity in precracked specimens may be performed.

FIG. 1 illustrates the results of a macro cell current test performed on a post-construction concrete material using the disclosed additive solution/system with thinning agent. The plot of FIG. 1 illustrates the advantageous effect of the disclosed additive composition on an already-corroding reinforcing bar within a hardened concrete structure. This specimen showed corrosion as a result of 168 weeks (1176 days) of corrosion testing pursuant to which the steel reinforced concrete block specimen was subjected to weekly cycles that involved 15% salt water ponding for a period of four (4) days, followed by three (3) days of drying. After week 168 (i.e., 1176 days), the disclosed additive solution/system with thinning agent was applied to the steel reinforced concrete block specimen via a spray application, i.e., in situ.

A reduction in voltage on the plot of FIG. 1 corresponds to or reflects a reduction in rate or level of corrosion. As shown in the plot of FIG. 1, a reduction in voltage was observed substantially simultaneously with the spray application of the disclosed solution/system with thinning agent to the surface of the specimen. Of particular note, the voltage level dropped below a threshold level of 0.1 mV, which generally reflects an absence of further corrosion at the treatment site. With further reference to FIG. 1, the anti-corrosion treatment of the present disclosure was effective to maintain a significantly reduced level or rate of corrosion (as measured by voltage drop) for a period of about thirty six (36) weeks, i.e., to about day 1428, at which point the voltage drop began to increase. Throughout the thirty six week period, the specimen was subjected to an ongoing weekly corrosive cycle of 15% salt water ponding for four (4) days followed by three (3) days of drying. As reflected in FIG. 1, a further post-construction treatment was effected at or around day 1513, which again caused the voltage drop to decrease, i.e., reduced the level/rate of corrosion for the post-construction material. Once again, corrosion levels went down significantly.

A re-application of the disclosed anti-corrosion solution/system may be undertaken on a periodic basis, e.g., based on empirical results as to the time period over which the disclosed solution/system is likely to be washed away and/or depleted in its functioning capacity. The frequency of re-application may be influenced by a number of factors, e.g., ambient conditions, level/amount of initial application, depth at which reinforcing steel is positioned, overall age of the concrete structure, surface wear, and the like. The re-application of the disclosed anti-corrosion solution/system may be undertaken in an automated fashion, e.g., by placing application mechanisms (sprayers or the like) in proximity to the structure for automatic application of the disclosed solution/system at predetermined times/intervals. In a further exemplary embodiment of the present disclosure, application/re-application of the disclosed anti-corrosion solution/system may be remotely effectuated, e.g., by remotely actuating an application mechanism using RF technology or the like. Alternative approaches and/or mechanisms for effecting periodic application of the disclosed solutions/systems are contemplated, and the exemplary approaches disclosed herein should not be viewed as limiting of the present disclosure. For example, the disclosed additive composition/solution may be applied through a variety of painting, pouring and/or "squeegee" techniques.

Generally, corrosion is a difficult process to inhibit and seems to be an even more difficult process to arrest/stop once it has begun. Application of the additive composition/solution to post-construction structures and elements has demonstrated dramatic effectiveness in mitigating ongoing corrosion and reducing the rate and degree of corrosion progress. The data set forth in FIG. 1 demonstrates the effectiveness of the disclosed solution/system for purposes of post-construction applications, showing specifically that for a period of thirty-six weeks post-application in an aggressive test environment that effects accelerated aging, a significantly decreased voltage level was observed and sustained, which translates to a dramatic reduction and/or an effective elimination of corrosion after application of the disclosed solution/system thereto.

Figure 2:
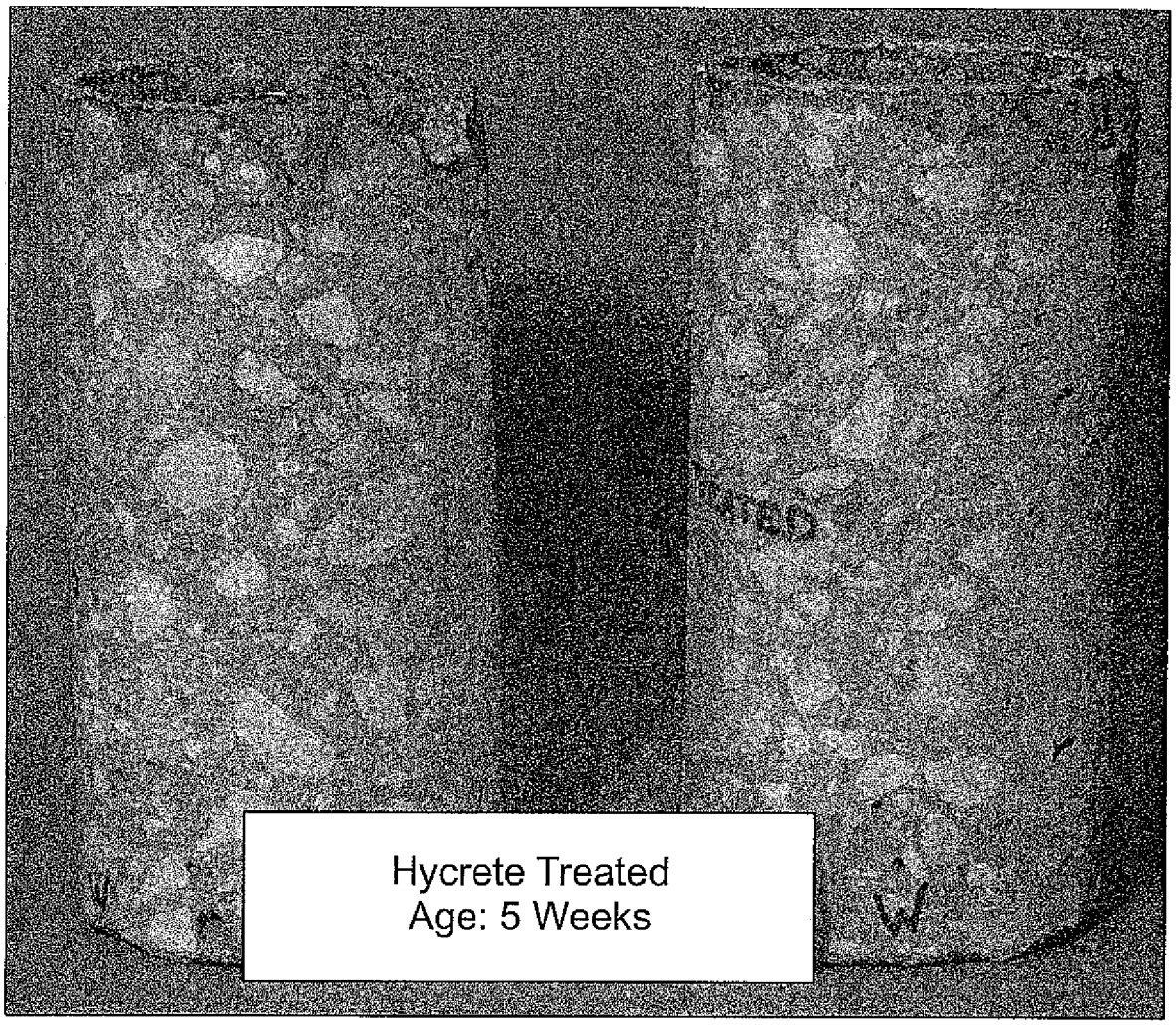
FIG. 2 illustrates post-construction concrete articles treated with an exemplary corrosion-inhibiting solution/system according to the present disclosure five (5) weeks after treatment.
Figure 3:
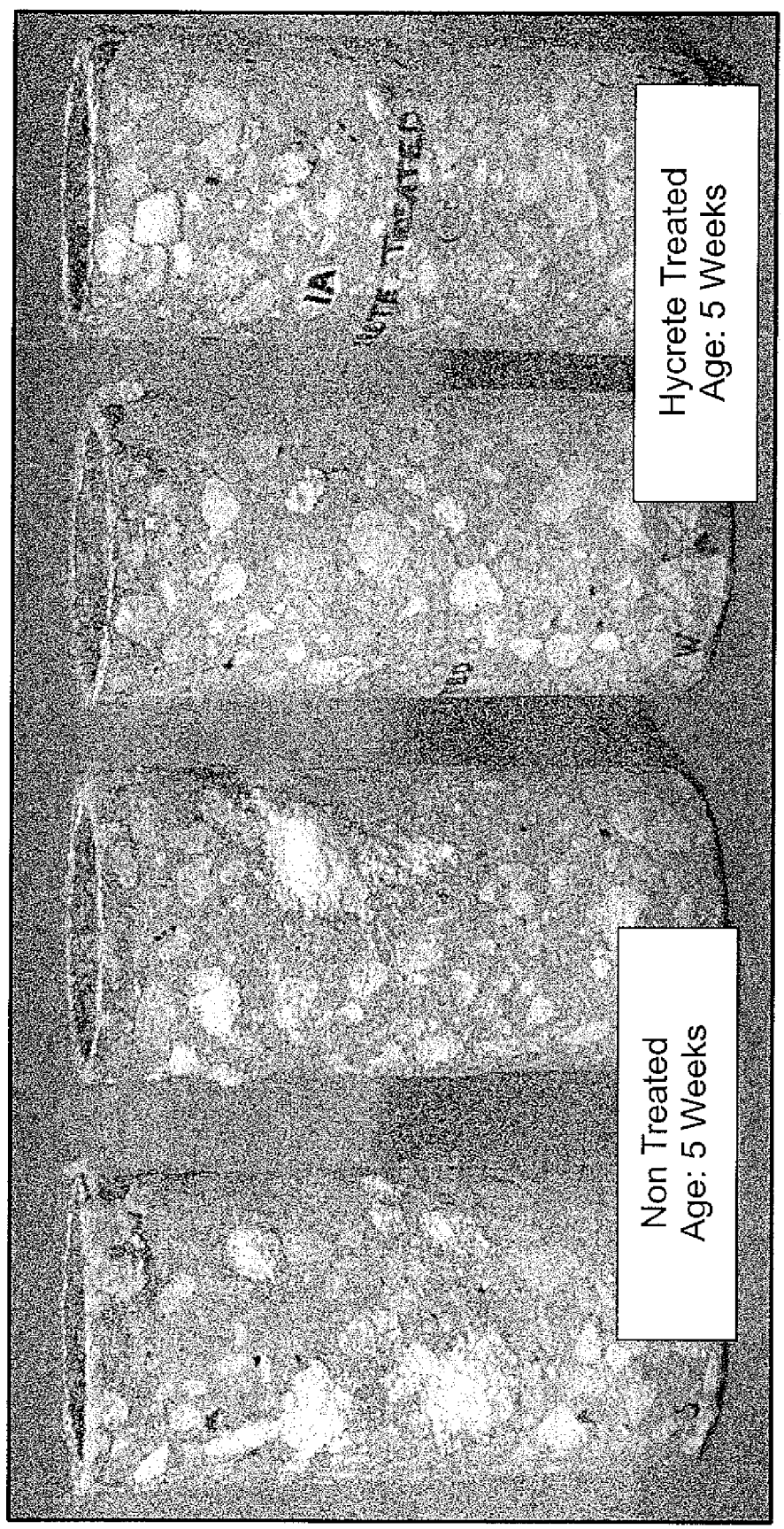
FIG. 3 illustrates a comparison of: (i) post-construction concrete articles treated with an exemplary corrosion-inhibiting solution/system according to the present disclosure five (5) weeks after treatment and (ii) post-construction concrete articles without treatment.

With additional reference to FIGS. 2 and 3, a series of test specimens are shown. The significance of the different visual characteristics of the test specimens with respect to samples that received treatment using the disclosed additive composition/system (post-hardening) and those that did not receive the disclosed treatment (i.e., non-treated specimens) is discussed herein below.

FIG. 2 illustrates two (2) post-construction concrete cups that are substantially hollow on the inside (i.e., hollow for about two-thirds of their respective heights) and that were treated on the inside with the disclosed additive composition/system. The additive composition/system was applied by brushing a treatment solution onto the inner surface of the hollow cup. After treatment, the interior regions of the concrete cups depicted in FIG. 2 were substantially filled with a salt solution and such salt solution was maintained within the cavity for a period of five (5) weeks. As is apparent from the images of FIG. 2, minimal indications of salt migration through the walls of the cup wall were detectable. The irregularly shaped white/pale constituents visible at the surface of the cement cups corresponds to aggregate, as opposed to salt. The absence of salt migration through the wall of the concrete cup, as is apparent for purposes of the treated concrete cups of FIG. 2, reflects an effective anti-corrosive effect because, if salt were free to migrate to the outer surface of the cup, then corrosive agents would be free to migrate to internal components of a post-construction assembly/member, e.g., a reinforced steel member, and initiate/support corrosion thereof.

By contrast and with specific reference to FIG. 3, the two concrete cups on the left did not receive a post-construction treatment of the disclosed anti-corrosive composition/system. Rather, a salt solution was added to the interior region and maintained therein for five (5) weeks without any corrosive preventive treatment. As is apparent from the substantial white blotches/regions on the outer surface of the non-treated concrete cups, significant levels of salt migration through the non-treated cup walls is clearly discernable. This salt migration would translate to an increased level of corrosion in field installations or other post-construction concrete systems. Clearly, the treated samples (the two concrete cups at the right of FIG. 3) demonstrate improved performance, as measured by levels of salt migration over a five (5) week test period, and further establish the efficacy of the disclosed post-construction treatment modality for purposes of inhibiting and/or eliminating corrosion effects in post-construction materials. Indeed, the comparative images of FIG. 3 clearly demonstrate the efficacy of the disclosed post-construction treatment modality in achieving advantageous corrosion-related results.

As disclosed herein, the additive composition/system may be applied to the surface of existing concrete or mortar, i.e., a post-construction material, and generally functions to penetrate cracks in the concrete/mortar to reach reinforcing steel or other potentially corrosive materials positioned there-within, thereby preventing corrosion of the steel while reducing moisture permeability of the concrete. The additive composition may be applied by standard application methods including, for example, but not limited to, ponding or roller applied as well as high pressure and low pressure spraying applications. In an exemplary embodiment of the present disclosure, approximately 1 gallon of the disclosed solution (20% active composition/80% water plus thinning agent at about 5% to 70% by weight) may be applied to 50 to 150 square feet of concrete surface. In other exemplary embodiments, prior to applying the disclosed solution composition to a surface, the surface may be cleaned, for example, or pressure washed to remove any existing laitance, contaminates, coatings, dirt and/or pollution. The surface may then preferably be rinsed with clean water and allowed an opportunity to dry prior to application of the additive composition. Optionally, more than one coat of the additive composition may be sequentially applied to the surface, e.g., 2 to 5 treatment applications.

In other exemplary embodiments, the disclosed solution/composition may be mixed with an additional coating/carrier that may have a low viscosity to increase penetration of the composition into the concrete and then applied to post-construction material. The coating/carrier may also have surfactant properties that facilitate penetration into the hardened concrete material of the treatment system. For example, the solution/composition disclosed herein may be mixed with a carrier and applied to existing reinforced concrete structures. Embodiments of the present disclosure provide numerous advantages, including, for example, the additive composition is environmentally safe and is an air entraining agent in fresh concrete. Indeed, exemplary embodiments of the disclosed treatment system/solution exhibit reduced levels of volatile organic compounds (VOCs) relative to other types of surface treatments. Additionally, the use of the disclosed additive composition in post-construction applications eliminates the need for membranes and other water management systems, offers decreased maintenance costs by increasing service life, as well as providing a value-engineered solution to water proofing and corrosion protection challenges.

The following examples are illustrative of the processing of the alkene and cyclic diene in connection with generation of the disclosed composition/solution for post-construction treatment.

EXAMPLE 1

About 300 grams of 2,5-furanedione and 750 grams of tetramethylethylene together with one (1) gram of BHT antioxidant are added to a stainless steel reaction vessel. The reaction mix is vigorously agitated at about 250° C. under an $N_2$ blanket for about 4 hours. After removal of unreacted material at reduced pressure, the resulting product is processed in a thin film evaporator at about 235° C. and about 5 mm of Hg, collecting about 730 grams of product light fraction wherein the bottom fraction is waste.

The produced light fraction is introduced into a stainless steel reaction vessel, including a reflux condenser, and heated to about 100° C. for about 2 hours, whereupon about 80 grams of sodium hydroxide solution is slowly added and agitated until there is formed a clear yellow solution of a butane dioic acid dodecenyl disodium salt. Isopropyl alcohol is then added as a thinning agent in an amount of about 25% to decrease viscosity of the system. A reduced viscosity is advantageous in increasing the potential penetration depth of the solution/system when applied to a post-construction, reinforced or unreinforced concrete structure in situ.

EXAMPLE 2

Following a similar procedure as described in Example 1, ninety eight (98) grams of maleic anhydride and one hundred sixty eight (168) grams of propylene tetramer at about 230° C. at about 40 psi for about 4 hours. After removal of the unreactive materials, a distillate is formed and after preliminary heating and agitation, sodium hydroxide in the amount of about 0.27 grams is slowly added to form a salt solution of a butane dioic acid dodecnyl disodium salt.

During the preparation of the additive composition of the disclosure, anti-foaming agents such as 2-methyloxymethylethoxy propane may be used in amounts of from about 0.02% to about 0.10% by weight. Additional stabilizing agents, such as benzoic acid, maleic acid and the like, may also be employed. Isopropyl alcohol is added as a thinning agent, in an amount of about 25% to decrease viscosity, which in turn increases penetration depth when applied to a reinforced or unreinforced concrete structure in situ.

While the present invention has been described with respect to the exemplary embodiments thereof, it will be recognized by those of ordinary skill in the art that many modifications, enhancements, variations and/or changes can be achieved without departing from the spirit and scope of the invention. Therefore, it is manifestly intended that the invention be limited only by the scope of the claims and equivalents thereof.

What is claimed:

1. In combination:
   a composition providing corrosion resistance for application to a post-construction material having a formula

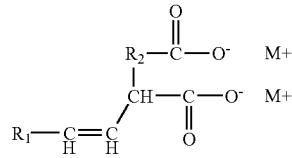

wherein M+ is selected from the group consisting of Na+ and K+, $R_1$ is a $C_1$ to $C_{24}$ branch or linear aliphatic compound, and $R_2$ is a $C_1$ to $C_{10}$ branch or linear aliphatic compound; and
   a post-construction material;
   wherein the composition is applied to at least one surface of the post-construction material after the post-construction material has hardened.

2. The combination according to claim 1, wherein the composition further comprises a thinning agent in an amount of about 5% to about 70% by weight.

3. The combination according to claim 2, wherein the thinning agent is selected from the group consisting of isopropyl alcohol, ethanol, xylene and combinations thereof.

4. The combination according to claim 1, wherein the composition is an aqueous solution of a metal salt of a dioic acid.

5. The combination according to claim 1, wherein the post-construction material is selected from the group consisting of reinforced or unreinforced concrete.

6. The combination according to claim 1, wherein the at least one surface of the post-construction material has been washed.

7. The combination according to claim 1, further comprising mixing the composition with a coating material.

8. The combination according to claim 1, further comprising a reapplication of the composition to the at least one surface of the post-construction material.

9. The combination according to claim 8, wherein the reapplication is effected on a periodic basis.

10. The combination according to claim 1, wherein the post-construction material includes as least one constituent selected from the group consisting of concrete, mortar, stucco and steel.

11. The combination according to claim 1, wherein said application is effective to reduce the rate of corrosion of said post-construction material.

12. The combination according to claim 1, wherein said application to the at least one surface of the post-construction material is effected by an application mechanism selected from the group consisting of spray application, brush application, mist application, and combinations thereof.

* * * * *